(12) United States Patent
Arcand (10) Patent No.: US 8,108,465 B2
(45) Date of Patent: Jan. 31, 2012

(54) METHOD AND SYSTEM FOR REQUEST PROCESSING

(75) Inventor: Jean-Francois Arcand, Prevost, CA (US)

(73) Assignee: Oracle America, Inc., Redwood City, CA (US)

( * ) Notice: Subject to any disclaimer, the term of this patent is extended or adjusted under 35 U.S.C. 154(b) by 521 days.

(21) Appl. No.: 11/931,673

(22) Filed: Oct. 31, 2007

(65) Prior Publication Data

US 2009/0112992 A1 Apr. 30, 2009

(51) Int. Cl.
*G06F 15/16* (2006.01)
*G06F 7/00* (2006.01)

(52) U.S. Cl. ........ 709/205; 709/204; 709/248; 707/613; 707/754

(58) Field of Classification Search ............ 709/204–207
See application file for complete search history.

(56) References Cited

U.S. PATENT DOCUMENTS

| 6,981,061 B1* | 12/2005 | Sakakura | 709/248 |
| 2005/0038801 A1* | 2/2005 | Colrain et al. | 707/100 |
| 2008/0301228 A1* | 12/2008 | Flavin | 709/204 |

* cited by examiner

*Primary Examiner* — Ian N Moore
*Assistant Examiner* — Thai Nguyen
(74) *Attorney, Agent, or Firm* — Osha • Liang LLP (57) ABSTRACT

The invention relates to a method for request processing. The method includes receiving an asynchronous request for a shared context from a first client, where a second client is subscribed to the shared context. The method further includes receiving a modification of the shared context from the second client and, determining, in response to receiving the modification, that the modification matches a criteria specified in a first request filter, where the first request filter is one of a number of request filters associated with the shared context. The method further includes obtaining the first request filter and after determining that a first condition specified in the first request filter is satisfied, initiating the transmission of the modification to the first client, where the modification is displayed at the first client.

9 Claims, 7 Drawing Sheets

METHOD AND SYSTEM FOR REQUEST PROCESSING

BACKGROUND

A web server may transmit web content to clients using a variety of methods. Typically, multiple clients will request the same web content from a web server. In its simplest form, the web server may then transmit the web content to the clients over a hypertext transfer protocol (HTTP).

More sophisticated web applications may require alternate methods of transferring web content to the clients. For example, a web server may provide access to a robust web application, where content on the page is updated asynchronously. In this case, an Asynchronous Javascript and XML (AJAX) framework may be used to transmit web content to the clients. More specifically, the AJAX framework allows clients to request modified web content using Javascript™. Javascript™ is a trademark of Sun Microsystems™, Inc. located in Santa Clara, Calif. Upon receipt of the modified web content only the portion of the web content that was modified (when compared with the web content currently on the client) is reloaded.

AJAX allows clients to update web content asynchronously; however, AJAX does not allow for event driven content to be pushed from the web server to the clients. To address this limitation, web applications may implement client polling to continuously request modifications of the web content from the web server. However, polling may be highly inefficient because a client will often poll the web server when no modifications have been made. Alternatively, web servers may use the Comet framework to build event driven web applications. Typically, the Comet framework requires that a connection be asynchronously established between the client and the server. The connection must then remain unbroken, allowing the server to push events to the client at will.

For example, a web server may provide a chat room implementing AJAX and the Comet framework to a group of clients. In this example, the Comet framework requires that each client maintain an unbroken connection to the web server. When a client sends a message to the chat room, the web server would be able to push the message to the other clients through the unbroken connections. In the case where a large number of clients are subscribed to the chat room, the web server may have difficulty simultaneously pushing the message to each of the other clients. Typically, this issue may be addressed by increasing the memory and processing power of the web server.

SUMMARY

In general, in one aspect, the invention relates to a method for request processing. The method includes receiving an asynchronous request for a shared context from a first client, where a second client is subscribed to the shared context. The method further includes receiving a modification of the shared context from the second client and determining, in response to receiving the modification, that the modification matches a criteria specified in a first request filter, where the first request filter is one of a number of request filters associated with the shared context. The method further includes obtaining the first request filter and after determining that a first condition specified in the first request filter is satisfied, initiating the transmission of the modification to the first client, where the modification is displayed at the first client.

In general, in one aspect, the invention relates to a system for request processing that includes a continuation module. The continuation module is configured to receive an asynchronous request for a shared context from a first client, where a second client is subscribed to the shared context. The continuation module is further configured to receive a modification of the shared context from the second client, and determine, in response to receiving the modification, that the modification matches a criteria specified in a first request filter, where the first request filter is one of a number of request filters associated with the shared context. The continuation module is further configured to obtain the first request filter and initiate the transmission of the modification to the first client after determining that a first condition specified in the first request filter is satisfied, where the modification is displayed at the first client.

In general, in one aspect, the invention relates to a computer readable medium, embodying instructions executable by the computer to perform method steps for request processing, the instructions including functionality to receive an asynchronous request for a shared context from a first client, where a second client is subscribed to the shared context. The instructions further include functionality to receive a modification of the shared context from the second client and determine, in response to receiving the modification, that the modification matches a criteria specified in a first request filter, where the first request filter is one of a number of request filters associated with the shared context. The instructions further include functionality to obtain the first request filter and after determining that a first condition specified in the first request filter is satisfied, initiate the transmission of the modification to the first client, where the modification is displayed at the first client.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. As used herein in the specification and figures, "ST" is essentially the same as "Step."

In general, embodiments of the invention relate to a method and a system for providing request processing. More specifically, embodiments of the invention provide a method and system for processing requests for a shared context using a request filter. The request filter may specify criteria and conditions for processing modifications made in a shared context. In addition, embodiments of the invention provide a method and system for managing connections using a connection pool.

In one or more embodiments of the invention, "requests" as used in the specification and figures corresponds to asynchronous requests. For example, a client may be configured to continue execution of an application after sending an asynchronous request for web content.

Figure 1:
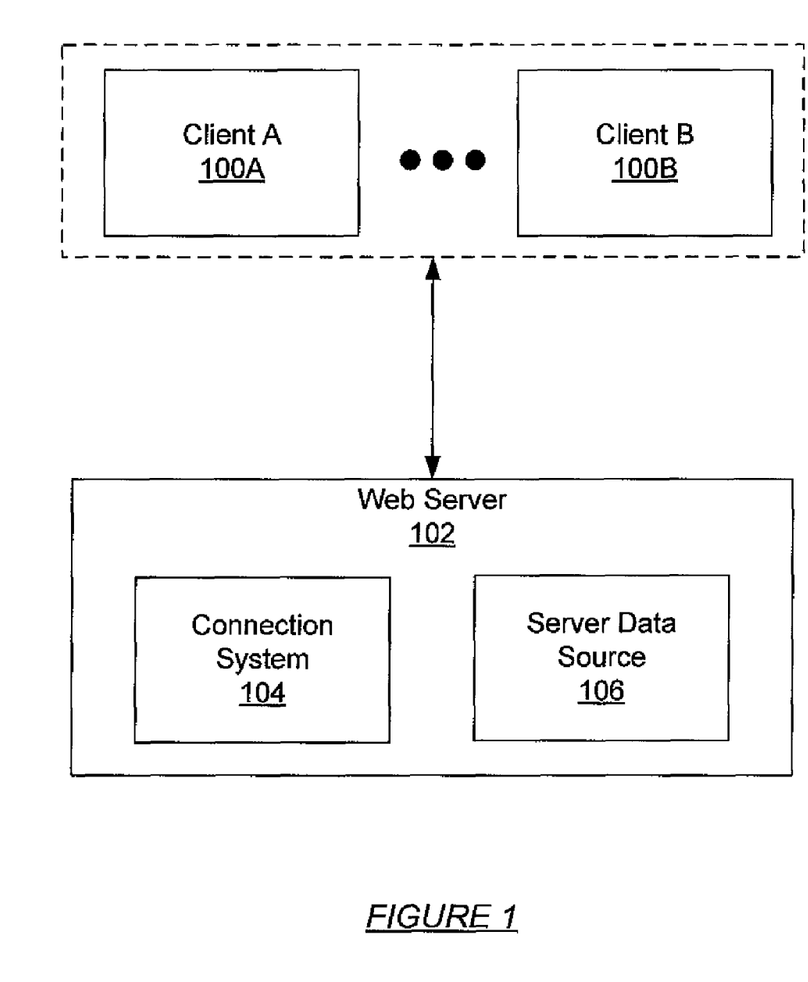
FIGS. 1-2 show systems in accordance with one or more embodiments of the invention.

FIG. 1 shows a system for request processing in accordance with one or more embodiments of the invention. The system includes clients (100A) interacting with a web server (102). The web server (102) further includes a connection system (104) and a server data source (106). Each of the aforementioned components is discussed below.

In one or more embodiments of the invention, each of the clients (100A) may correspond to a computer including a web browser. The clients (100A) may interact with the web server (102). For example, each of the clients (100A) may access the web server (102) over the Internet (or other Wide Area Network or Local Area Network) through the web browser (or other interface for communicating over a network). Alternatively, the clients (100A) may interact with the web server (102) through an application running natively the client (100A). Further, in one or more embodiments of the invention, the clients (100A) may interact with the web server (102) using an Asynchronous Javascript and XML (AJAX) framework. Alternatively, those skilled in the art will appreciate that the clients (100A) may interact with the web server (102) using a variety of frameworks (e.g., Java™ applets, web services, etc.) that utilize a hypertext transfer protocol (HTTP). Java™ is a trademark of Sun Microsystems™, Inc. located in Santa Clara, Calif.

In one or more embodiments of the invention, the web server (102) may be configured to receive requests for web content from the clients (100A). In one or more embodiments of the invention, the web server (102) may be configured to process the requests using the connection system (104). More specifically, the web server (102) is configured to obtain the web content in response to the request and transmit the web content to the clients (100A).

In one or more embodiments of the invention, the web server (102) may be configured to store information in the server data source (106). In one or more embodiments of the invention, the server data source (106) is a data store (e.g., a database, a file system, one or more data structures configured in a memory, an extensible markup language (XML) file, some other medium for storing data, or any suitable combination thereof), which may include information (e.g., dynamic web content, web server configurations, etc.) related to the web server (102).

In one or more embodiments of the invention, the connection system (104) may be configured to process requests for the web content. More specifically, the connection system (104) may be configured to monitor and/or manage access to the web content associated with a shared context. For example, the connection system (104) may be configured to generate handler(s) configured to manage access to the shared context by the clients (100A). In one or more embodiments of the invention, a handler may be configured to process events associated with the shared context. For example, the handler may be configured to, in response to the notification, initiate a transmission of a modification to the shared context to a Client 1 (100A). In one or more embodiments of the invention, a handler may be further configured to receive and process modifications of the shared context. For example, a handler may be configured to receive and process modifications of the shared context from a Client 2 (100B).

In one or more embodiments of the invention, the connection system (104) may be configured to manage connections associated with the clients (100A). More specifically, the connection system (104) may be configured to manage a connection pool associated with the connections. In one or more embodiments of an invention, a connection pool may be associated with a connection threshold. The connection threshold may correspond to the maximum number of simultaneous connections that may be included in the connection pool. In one or more embodiments of the invention, the connection threshold may be a configurable value.

Figure 2:
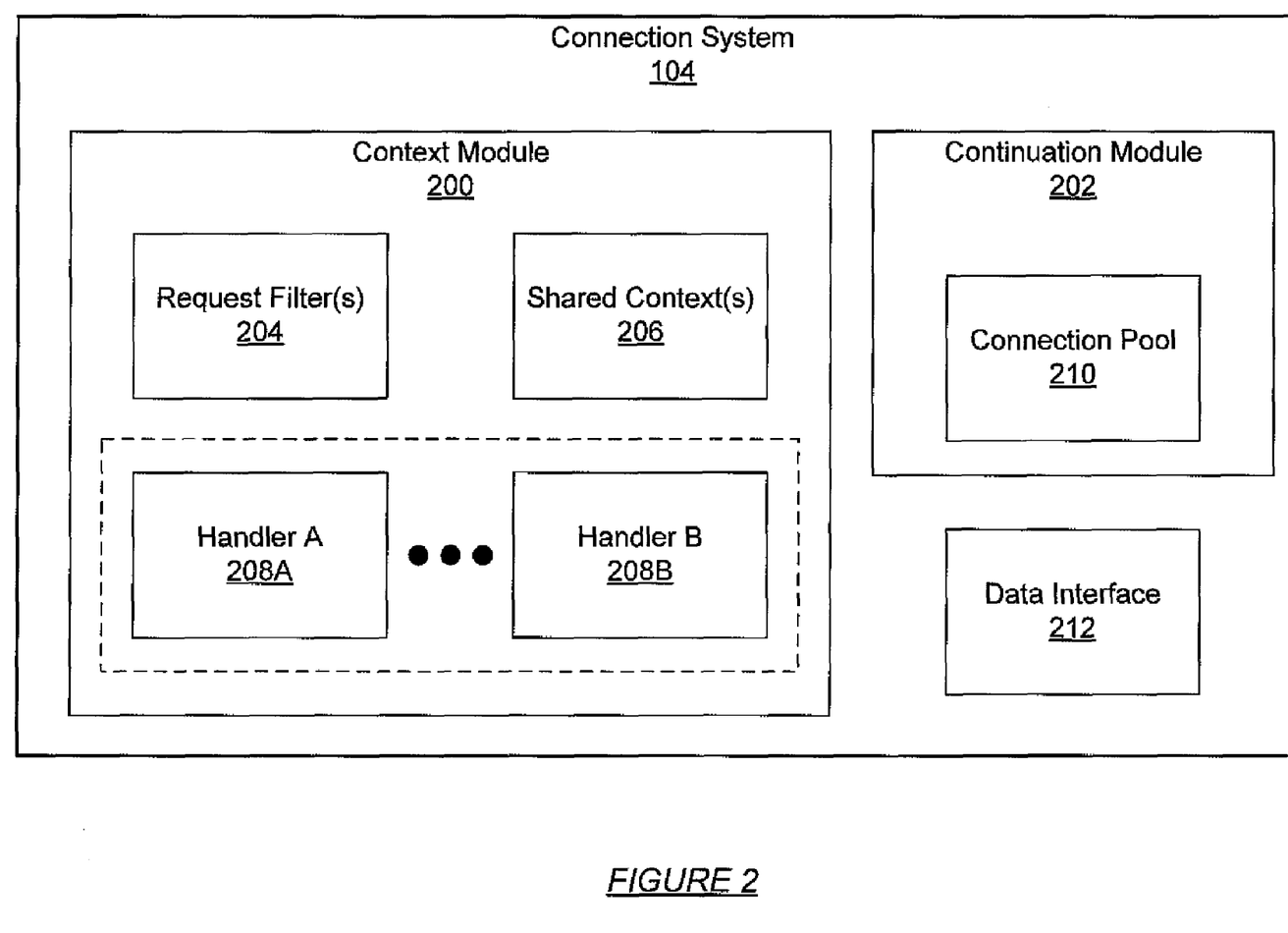

FIG. 2 shows a connection system (104) for request processing in accordance with one or more embodiments of the invention. The connection system (104) includes a context module (200), a continuation module (202), and a data interface (212). The context module (200) further includes request filter(s) (204), shared context(s) (206), and handler(s) (208A, 208B). The continuation module (202) may further include a connection pool (210). Each of the aforementioned components is discussed below.

In one or more embodiments of the invention, the connection system (104) may be configured to process requests for web content using the context module (200). More specifically, the connection system (104) may be configured to use the context module (200) to manage access to the web content associated with the shared context(s) (206). In one or more embodiments of the invention, a shared context (206) may be associated with web content accessible by client(s) (100 in FIG. 1). More specifically, the shared context (206) may include web content that client(s) (100 in FIG. 1) may request. In addition, the shared context (206) may be configured to incorporate modifications from the client(s) (100 in FIG. 1).

The following are examples of shared contexts. The examples are included to aid the description of the invention and not intended to limit the scope of the invention. Shared Context Example 1—A news web page that scrolls breaking news along the bottom portion of the web page. The news web page is concurrently viewed by thousands of users. When a new breaking story occurs, the content is sent to all browsers (or a subset thereof) using one or more embodiments of the invention. In this example, the web page is shared context.

Shared Context Example 2—A web-based chat room application through which three individuals are sending instant messages to one another. When one user posts a message in the chat room, the message is pushed to the other two users such that all users are able to view the message posted by the user. In this example, the chat room window in which the posts are displayed is the shared context.

Continuing with the discussion of FIG. 1, in one or more embodiments of the invention, the context module (200) may be configured to use request filter(s) (204) to process requests for web content associated with shared context(s) (206). Said another way, the context module (200) includes functionality to determine whether a particular modification should be sent to a given client using the request filter(s) (204). The request filter(s) (204) may include criteria associated with modifications of the shared context(s) (206). In one or more embodiments of the invention, the criteria may be configured to filter modifications. More specifically, the context module (200) may be configured to match the criteria to modifications of the shared context(s) (206). For example, a criterion may specify a variety of modification attributes (e.g., client associated with a modification, quantity of modifications from a client, content of a modification, etc.) for matching to the modifications.

In addition, the request filter(s) (204) may include conditions associated with the shared context(s) (206). In one or more embodiments of the invention, a condition may be used to manage notifications of modifications. More specifically, a condition may have to be satisfied before modifications from a particular client (100A in FIG. 1) are processed. The condition may specify a variety of requirements (e.g., a time delay, a quantity of messages for forming a batch, restrictions on the content of the modification, etc.) that must be satisfied before a modification is processed. For example, a condition may prevent a modification from being sent to a client (100A in FIG. 1) when the modification includes inappropriate content (e.g., spam, vulgarity, etc.). In another example, when a client (100A is FIG. 1) makes a number of modifications in a short period of time (e.g., 5 seconds), a condition may delay processing a group of modifications until a certain number of modifications are received (i.e., a batch).

In one embodiment of the invention, the request filter(s) (204) may be associated with two sets of criteria. The first set of criteria is used to determine whether to apply the request filter(s) (204) and the second set of criteria is the application of the request filter(s) (204) to the modification. (See e.g., FIG. 3, ST 304 and ST 306). Further, the request filter(s) (204) may be associated with a shared context (i.e., the request filter(s) (204) is used for all modifications made to the shared context). Alternatively or in addition to, the request filter(s) (204) may be associated with a particular client. In some cases, both shared context-specific request filter(s) (204) and client-specific request filter(s) (204).

Continuing with the discussion of FIG. 1, in one or more embodiments of the invention, the context module (200) may be configured to initiate one or more handler(s) (208A, 208B). The handler(s) (208A, 208B) may be configured to supervise interactions between the client(s) (100A in FIG. 1) and the shared context(s) (206). More specifically, a handler (208A, 208B) may be configured to receive a request for the web content associated with a shared context (206) from a client (100A in FIG. 1). In addition, a handler (208A, 208B) may be configured to monitor events associated with the shared context (206). For example, the handler (208A, 208B) may be configured to process a notification of a modification of a shared context (206) by a client (100B in FIG. 1). In this case, the handler (208A, 208B) may be configured to send the modification of the shared context (206) to the client (100A of FIG. 1).

In one or more embodiments of the invention, the connection system (104) may use the continuation module (202) to manage connections associated with client(s) (100A in FIG. 1). More specifically, in one or more embodiments of the invention, the context module (200) may use the continuation module (202) to obtain a connection. For example, a handler 1 (208A, 208B) may send a modification using a connection obtained from the continuation module (202).

In one or more embodiments of the invention, the continuation module (202) may be configured to manage connections in a connection pool (210). The connection pool (210) may be associated with connections, where each connection is associated with a client (100A in FIG. 1). Further, the connection pool (210) may be associated with a connection threshold. In this case, the continuation module (202) may be configured to suspend a connection in the connection pool (210) when the connection threshold is met. In one or more embodiments of the invention, the continuation module (202) may be configured to generate a property file associated with a connection when suspending the connection. The property file may include connection information (e.g., internet protocol address of client, timeout information, etc.) for resuming the connection. In one or more embodiments of the invention, the property file may be stored on a persistent storage device. Alternatively, the property file may be stored in memory as a file descriptor.

In one or more embodiments of the invention, the continuation module (202) may be configured to resume a connection using a property file. More specifically, the continuation module (202) may request the connection from the connection pool (210) and then resume the connection using the property file. In this case, the resumed connection may then be associated with a client (100A in FIG. 1) specified in the property file.

In one or more embodiments of the invention, the connection system (104) may use the data interface (212) to store information associated with request processing. More specifically, in one or more embodiments of the invention, the connection system (104) may use the data interface (212) to store information in a server data source (106 in FIG. 1). Examples of information associated with request processing include information associated with property files, information associated with the connection pool (210), information associated with request filter(s) (204), and information associated with shared context(s) (206).

Figure 3:
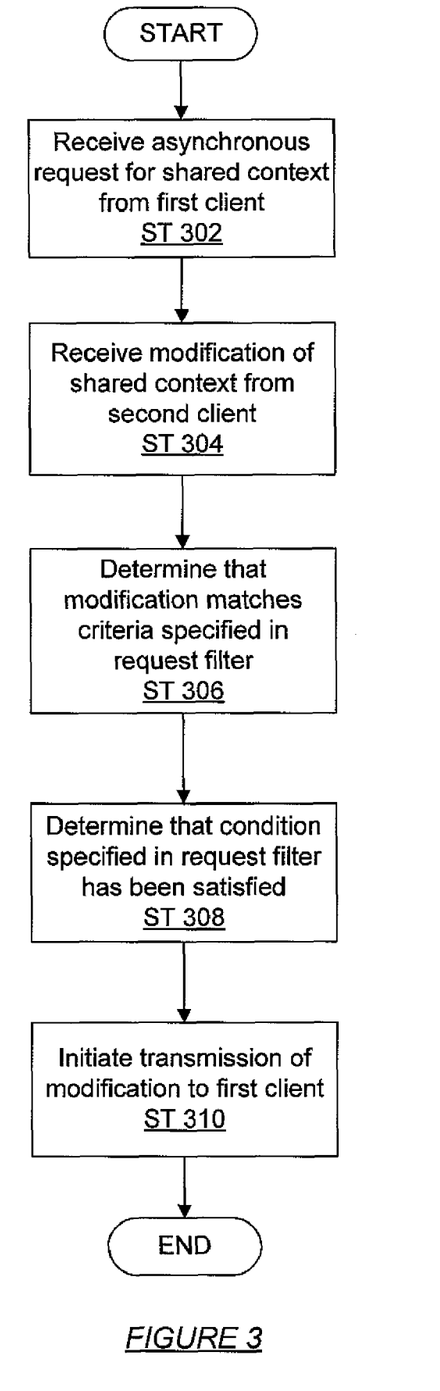
FIGS. 3-6 show flow charts in accordance with one or more embodiments of the invention.

FIG. 3 shows a flow chart for processing a modification in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In ST 302, an asynchronous request for web content associated with a shared context may be received from a first client. In one or more embodiments of the invention, the request may be received over an existing connection associated with the first client. Alternatively, a connection associated with the first client may be established to transmit the request. In this case, a handler associated with the connection may be initiated. In one or more embodiments of the invention, the web content may be transmitted to the first client in response to the request. The web content may then be displayed in a web browser associated with the first client.

In one or more embodiments of the invention, a modification of the shared context may be received from a second client (ST 304). More specifically, a modification of the web content associated with the shared context may be received from the second client. In one or more embodiments of the invention, the modifications may be received by a handler associated with a connection, which is in turn is associated with the second client.

At this stage, it may be determined that the modification matches a criterion specified in a request filter (ST 306). Said another way, an initial determination is made regarding whether a request filter should be applied to the modification. When the modification matches the criterion specified in the request filter, the request filter may be used to process the modification. Those skilled in the art will appreciate that any number of request filters may be associated with the shared context. In one or more embodiments of the invention, it may then be determined that a condition specified in the request filter is satisfied (ST 308). Said another way, in ST 308 a determination is made regarding whether the condition (e.g., a time delay, a quantity of messages for forming a batch, restrictions on the content of the modification, etc.) specified in the request filter is satisfied. Those skilled in the art will appreciate that any number of conditions may be specified in the request filter.

In response to determining that the condition is satisfied, a transmission of the modification to the first client may be initiated (ST 310). More specifically, a handler associated with the first client may be notified of the modification. In this case, the handler may then transmit the modification to the first client, where the modification is displayed.

Figure 4:
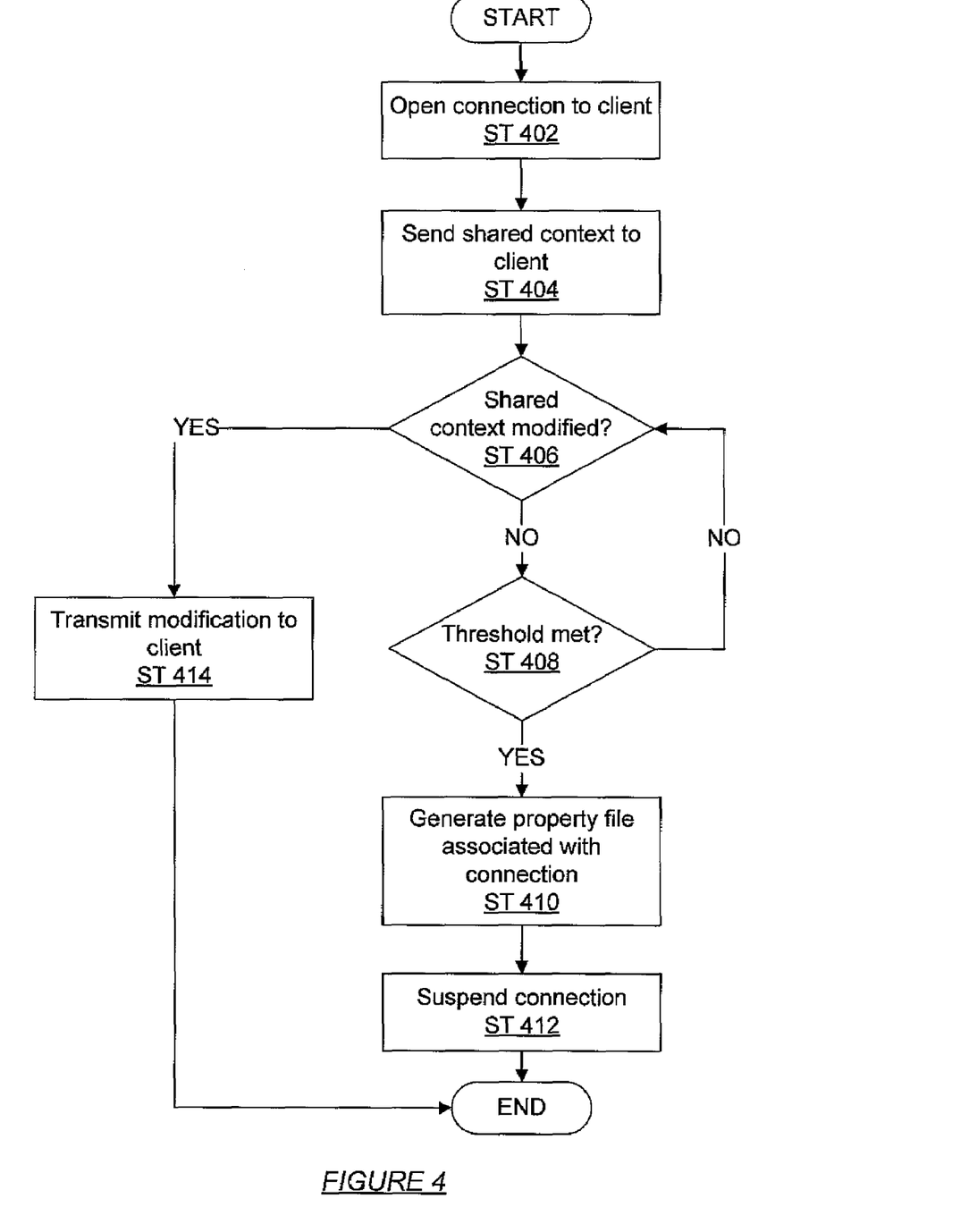

FIG. 4 shows a flow chart for request processing in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

In ST 402, a connection associated with a client may be opened. In one or more embodiments of the invention, the connection may be opened in response to receiving a request for web content associated with a shared context. In addition, a handler associated with the connection may be initiated. In one or more embodiments of the invention, the handler may be configured to manage interactions with the client. Further, the connection may be associated with a connection pool. In one or more embodiments of the invention, the connection pool may include a connection threshold specifying the maximum number of connections.

In one or more embodiments of the invention, the web content associated with the shared context may be sent to the client (ST 404). The web content may then be displayed at the client. At this stage, a determination may be made as to whether the shared context has been modified (ST 406). If the shared context has been modified (ST 406), the modification may be transmitted to the client (ST 414). In this case, the modification may then be displayed at the client. If the shared context has not been modified (ST 406), a determination may be made as to whether a connection threshold has been met (ST 408). If the connection threshold has not been met (ST 408), ST 406 may be repeated. Those skilled in the art will appreciate ST 406 may be repeated so long as the connection threshold is not met. Alternatively, those skilled in the art will appreciate will appreciate that ST 406 and ST 408 may be performed by using events that trigger actions in the handler.

Continuing with the discussion of FIG. 4, if the connection threshold has been met (ST 408), a property file associated with the connection may be generated (ST 410). Those skilled in the art will appreciate that the property file may include a variety of information associated with the connection (e.g., internet protocol address of client, timeout information, etc.).

At this stage, the connection associated with the client may be suspended (ST 412). In one or embodiments of the invention, the suspended connection may be returned to the connection pool. Those skilled in the art will appreciate that the resources associated with the connection may then be available to another client. In this case, the connection pool may be associated with a set amount of resources that are distributed between the connections associated with the connection pool.

Figure 5:
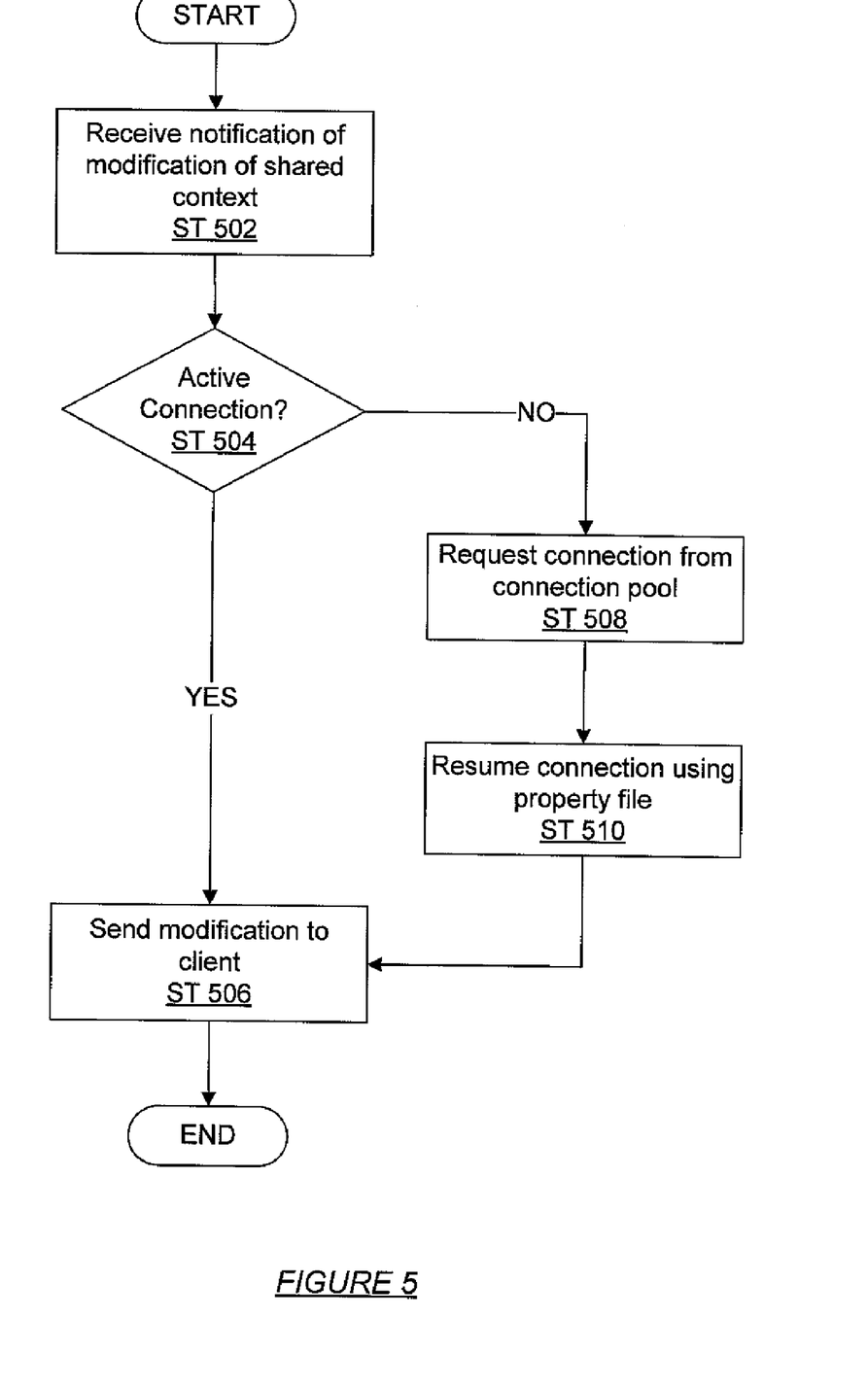

FIG. 5 shows a flow chart for request processing in accordance with one or more embodiments of the invention. In one or more embodiments of the invention, one or more of the steps shown in FIG. 5 may be omitted, repeated, and/or performed in a different order than that shown in FIG. 5. Accordingly, the specific arrangement of steps shown in FIG. 5 should not be construed as limiting the scope of the invention.

In ST 502, a notification of a modification of a shared context is received. In one or more embodiments of the invention, the modification may be from a second client. Alternatively, the modification may be generated from some other source (e.g., server-side modification, scheduled modifications, etc.). Those skilled in the art will appreciate that the modification may modify the web content associated with the shared context.

At this stage, a determination may be made as to whether an active connection associated with a first client exists (ST 504). If the active connection exists (ST 504), the modification may be transmitted to the first client (ST 506). The first client may then display the modification.

If the active connection does not exist (ST 504), a connection may be requested from the connection pool (ST 508). Those skilled in the art will appreciate that the connection pool may contain any number of connections that can be used to establish connection to the clients. After obtaining a connection from the connection pool, the connection may be resumed using a property file associated with the first client (ST 510). In one or more embodiments of the invention, the property file may include connection information that may be used to generate a connection to the first client. For example, the property file may include the internet protocol address of the client, which may be used to establish the connection. In one or more embodiments of the invention, the modification may then be sent to the client using the connection (ST 506).

The following discussion outlines an example of how the connection system described above may be used. The example is not intended to limit the scope of the invention.

Figure 6:
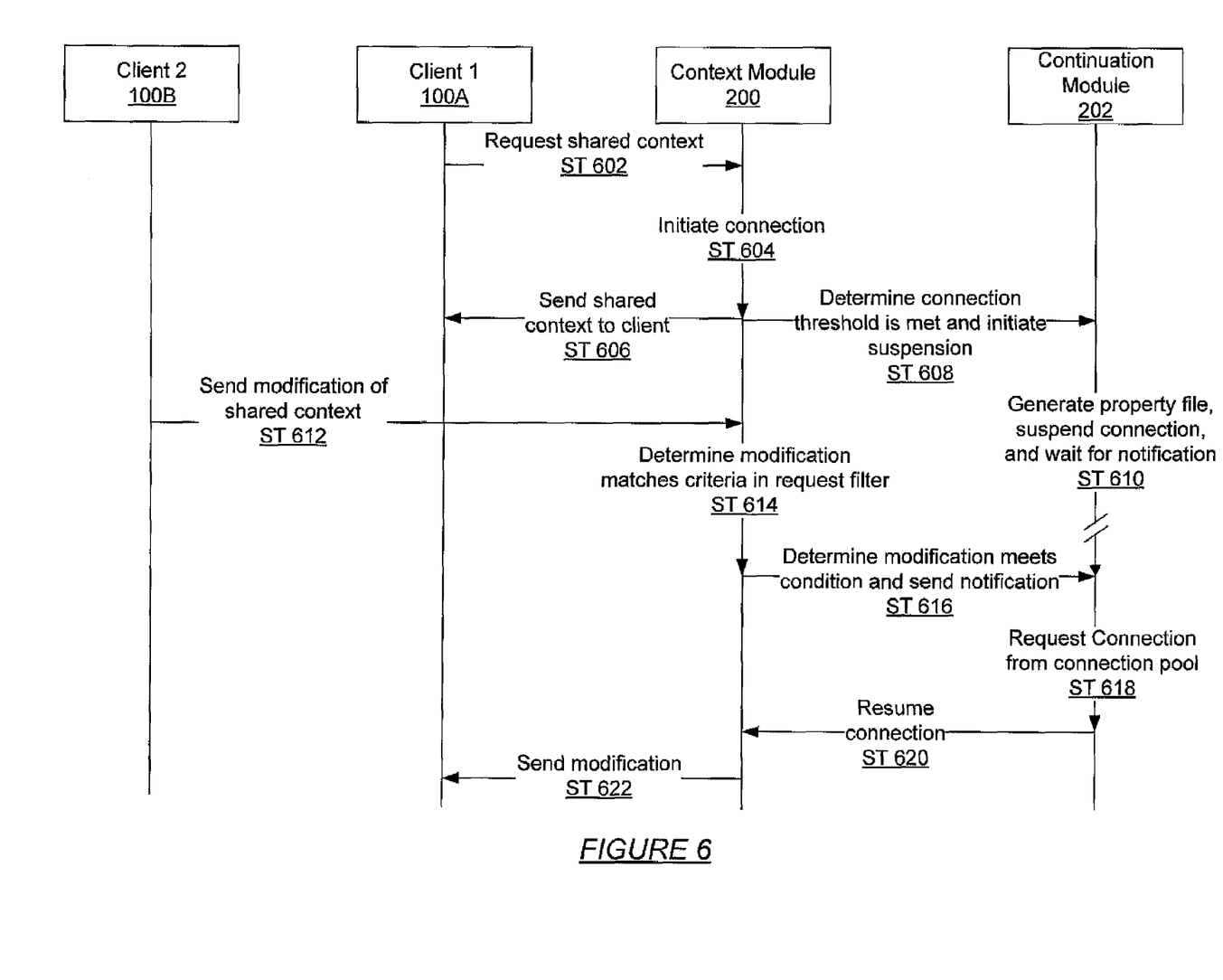

Turning to the example, assume that client 1 (100A) and client 2 (100B) wish to access web content associated with a shared context. The individual may, via the web server (not shown), interact with the context module (200) to access the web content.

In ST 602, client 1 (100A) sends a request for the web content associated with the shared context to the context module (200) (ST 602). The context module (200), in response to the request, may initiate a connection associated with client 1 (100A) (ST 604). Next, in response to the request, the context module (200) may send the web content to client 1 (100A) (ST 606).

Simultaneous or subsequent to sending the web content, the context module (200) may determine that the connection threshold has been met and initiate a suspension of the connection using the continuation module (202) (ST 608). Those skilled in the art will appreciate that any number of clients may be requesting the web content associated with the shared context, where each client requires a connection. At this stage, the continuation module (202) may generate a property file associated with the connection and suspend the connection (ST 610). Once suspended, the connection may return to a connection pool. Further, the continuation module (202) may wait for a notification of a modification to the shared context. Those skilled in the art will appreciate that the continuation module (202) may use a handler associated with client 1 (100A) to listen for the notification.

In one or more embodiments of the invention, the context module (200) may receive a modification of the web content associated with the shared context from client 2 (100B) (ST 612). Next, the context module (200) may determine that the modification matches criteria specified in a request filter (ST 614). After determining the modification matches the criteria, the context module (200) may determine that a condition specified in the criteria has been met and send notification of the modification to the continuation module (202) (ST 616).

In response to receiving the notification, the continuation module (202) may request a connection from the connection pool (ST 618). Next, the continuation module (202) may resume the connection using the property file and then provide the connection to the context module (200) (ST 620). The context module (200) may then use the connection to send the modification to client 1 (100A) (ST 622).

Those skilled in the art will appreciate that any number of clients may request the web content from the context module (200). In this case, the modification must to be sent to multiple clients. For example, a thousand clients may request the web content from the context module (200). When one of the clients makes a modification to the web content, the modification may have to be sent to the other nine hundred and ninety-nine clients. In this scenario, the context module (200) may use the request filter to optimize the processing of the modification. For example, the request filter may specify that the modification should be processed as part of a batch of modifications. In addition, the continuation module (202) may use the connection pool to optimize the use of resources in the connection system. For example, the connection threshold may specify that the maximum number of connections is one hundred. In this example, the one thousand clients would share the one hundred connections, preserving the resources that would have been required to create the additional nine-hundred connections. The specific values used in this example are not intended to limit the scope of the invention.

Figure 7:
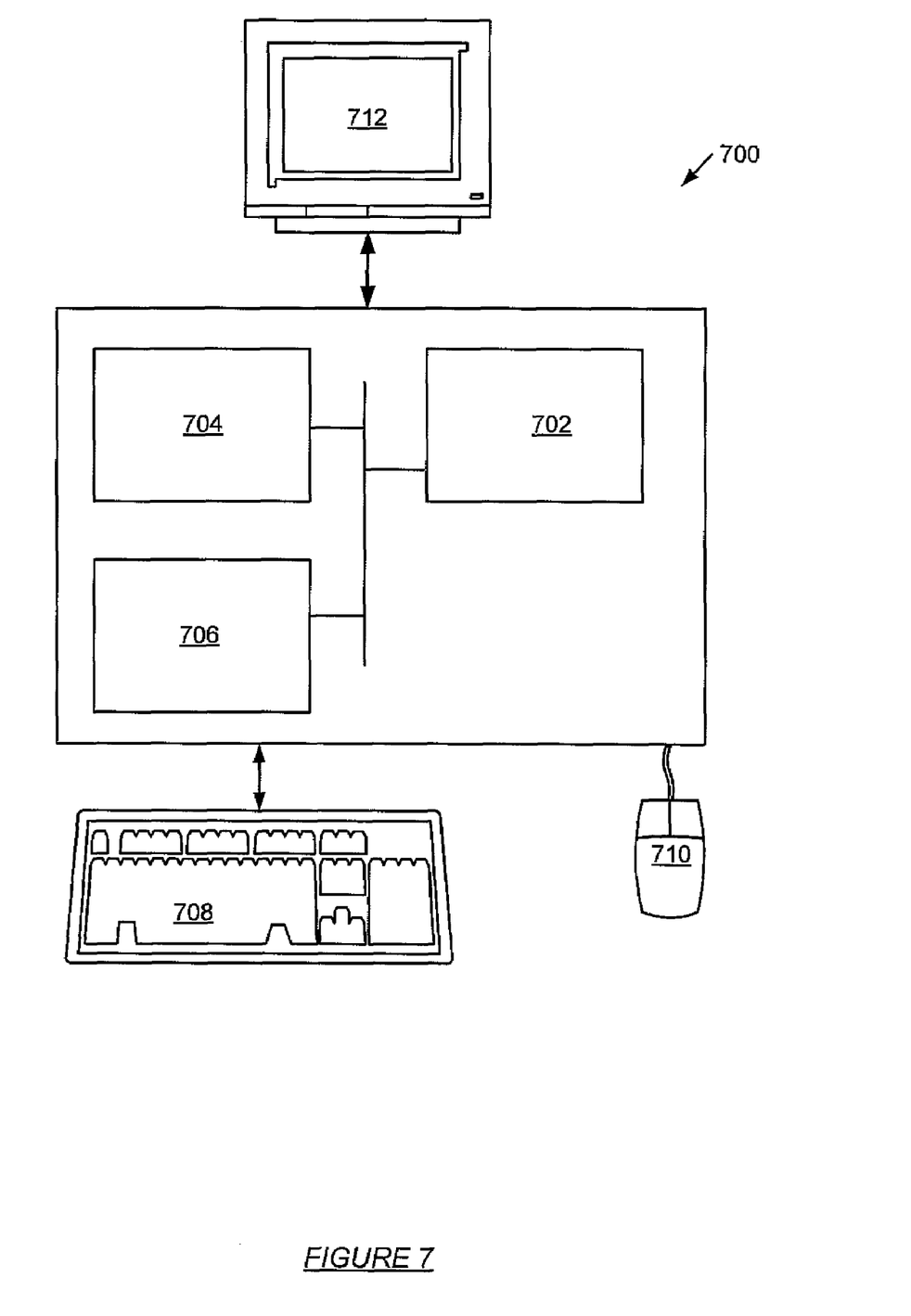
FIG. 7 shows a computer system in accordance with one or more embodiments of the invention.

The invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (700) may be located at a remote location and connected to the other elements over a network.

Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a tangible computer readable medium such as a compact disc (CD), a diskette, a tape, or any other computer readable storage device. Further, one or more embodiments of the invention may be implemented as an Application Program Interface (API) executing on a computer system(s), where the API includes one or more software instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for request processing, comprising:
    receiving an asynchronous request for a shared context from a first client, wherein a second client is subscribed to the shared context;
    adding a connection associated with the first client to a connection pool, wherein the connection pool is associated with a connection threshold;
    after determining that the connection threshold is met:
        generating a property file associated with the connection, wherein the property file comprises information for resuming the connection; and
        suspending the connection;
    initiating a handler associated with the first client, wherein the handler is configured to receive notifications of modifications of the shared context;
    receiving a notification of a modification of the shared context from the second client;
    determining, in response to receiving the notification of the modification, that the second client subscribed to the shared context matches a criteria specified in a first request filter, wherein the first request filter specifies a first condition and is one of a plurality of request filters associated with the shared context, wherein the first condition delays processing of client notifications of the modification until a certain number of modifications are received;
    obtaining, in response to determining that the second client subscribing to the shared context matches the criteria specified in the first request filter, the first condition from the first request filter; and
    after determining that the first condition for managing the notifications of the modification is satisfied:
        resuming the connection using the property file; and
        initiating a transmission of the modification to the first client using the connection, wherein the modification is displayed at the first client, wherein the shared context is associated with a second request filter of the plurality of request filters, wherein the second request filter specifies a second condition.

2. The method of claim 1, wherein the asynchronous request is transmitted using an Asynchronous Javascript and XML (AJAX) framework.

3. The method of claim 1, wherein the shared context comprises web content accessible by the first client and the second client, wherein the first client and the second client are configured to modify the web content.

4. A system for request processing, comprising:
    a memory; and
    a processor, operatively connected to the memory, for executing:
        a continuation module configured to:
            receive an asynchronous request for a shared context from a first client, wherein a second client is subscribed to the shared context;
            receive a notification of a modification of the shared context from the second client;
            determine, in response to receiving the notification of the modification, that the second client subscribed to the shared context matches a criteria specified in a first request filter, wherein the first request filter specifies a first condition and is one of a plurality of request filters associated with the shared context, wherein the first condition delays processing of client notifications of the modification until a certain number of modifications are received;
            obtain, in response to determining that the second client subscribing to the shared context matches the criteria specified in the first request filter, the first condition from the first request filter; and
            initiate a transmission of the modification to the first client using a connection after determining that the first condition for managing the notifications of the modification is satisfied, wherein the modification is displayed at the first client; and
        a context module configured to:

add the connection associated with the first client to a connection pool, wherein the connection pool is associated with a connection threshold;

generate a property file associated with the connection, wherein the property file comprises information for resuming the connection;

suspend the connection;

initiate a handler associated with the first client, wherein the handler is configured to receive notifications of modifications of the shared context; and resume the connection using the property file in response to the handler receiving the notification of the modification of the shared context, wherein the shared context is associated with a second request filter of the plurality of request filters, wherein the second request filter specifies a second condition.

5. The system of claim 4, wherein the asynchronous request is transmitted using an Asynchronous Javascript and XML (AJAX) framework.

6. The system of claim 4, wherein the shared context comprises web content accessible by the first client and the second client, wherein the first client and the second client are configured to modify the web content.

7. A non-transitory computer readable medium, embodying instructions executable by the computer to perform method steps for request processing, the instructions comprising functionality to:

receive an asynchronous request for a shared context from a first client, wherein a second client is subscribed to the shared context;

add a connection associated with the first client to a connection pool, wherein the connection pool is associated with a connection threshold;

after determining that the connection threshold is met:

generate a property file associated with the connection, wherein the property file comprises information for resuming the connection; and suspend the connection;

initiate a handler associated with the first client, wherein the handler is configured to receive notifications of modifications of the shared context;

receive a notification of a modification of the shared context from the second client;

determine, in response to receiving the notification of the modification, that the second client subscribing to the shared context matches a criteria specified in a first request filter, wherein the first request filter specifies a first condition and is one of a plurality of request filters associated with the shared context, wherein the first condition delays processing of client notifications of the modification until a certain number of modifications are received;

obtain, in response to determining that the second client subscribing to the shared context matches the criteria specified in the first request filter, the first condition from the first request filter; and after determining that the first condition for managing the notifications of the modification is satisfied:

resume the connection using the property file; and initiate a transmission of the modification to the first client using the connection, wherein the modification is displayed at the first client, wherein the shared context is associated with a second request filter of a plurality of request filters, wherein the second request filter specifies a second condition.

8. The computer readable medium of claim 7, wherein the asynchronous request is transmitted using an Asynchronous Javascript and XML (AJAX) framework.

9. The computer readable medium of claim 7, wherein the shared context comprises web content accessible by the first client and the second client, wherein the first client and the second client are configured to modify the web content.

* * * * *